United States Patent
Chang

(10) Patent No.: US 10,855,197 B2
(45) Date of Patent: Dec. 1, 2020

(54) POWER SUPPLY SYSTEM

(71) Applicant: DELTA ELECTRONICS, INC., Taoyuan (TW)

(72) Inventor: Shih-Chieh Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/459,317

(22) Filed: Jul. 1, 2019

(65) Prior Publication Data

US 2020/0220475 A1 Jul. 9, 2020

(30) Foreign Application Priority Data

Jan. 3, 2019 (CN) .......................... 2019 1 0003823

(51) Int. Cl.
*H02M 7/04* (2006.01)
*H02M 1/00* (2006.01)

(52) U.S. Cl.
CPC .............. *H02M 7/04* (2013.01); *H02M 1/00* (2013.01); *H02M 2001/0003* (2013.01)

(58) Field of Classification Search
CPC .............. Y10T 307/615; Y10T 307/62; Y10T 307/625; Y04S 20/12; Y04S 20/248; Y02B 90/14; Y02B 10/72; H02J 7/34; H02J 9/00; H02J 9/04
USPC .................................................... 307/64–66
See application file for complete search history.

(56) References Cited

U.S. PATENT DOCUMENTS

2004/0201931 A1* 10/2004 Korcharz .................. H02J 1/10
361/18
2013/0026822 A1* 1/2013 Chao ...................... B60L 58/18
307/9.1
2016/0006242 A1* 1/2016 Yamada .................... H02J 9/06
307/65
2017/0093205 A1* 3/2017 Banno ..................... H02J 1/108

FOREIGN PATENT DOCUMENTS

TW 201225473 A 6/2012
TW 201511445 A 3/2015
TW I633743 B 8/2018

\* cited by examiner

*Primary Examiner* — Nguyen Tran
(74) *Attorney, Agent, or Firm* — Kirton McConkie; Evan R. Witt

(57) ABSTRACT

A power supply system includes a power supply assembly, an auxiliary power circuit and a control unit. The power supply assembly converts input power into a first DC power when the input power outputted from an input power source is normal. The auxiliary power circuit includes at least one energy storage unit for providing a second DC power and power converter electrically connected between the energy storage unit and the load for converting the second DC power into an individual auxiliary power. The control unit drives the auxiliary power circuit to provide an overall auxiliary power to the load when the input power is normal and a transient power required by the load is greater than a upper limit rated value of an output power outputted from the power supply assembly, so as to compensate a difference value between the transient power and the upper limit rated value.

12 Claims, 2 Drawing Sheets

POWER SUPPLY SYSTEM

FIELD OF THE INVENTION

The present disclosure relates to a power supply system, and more particularly to a power supply system having at least one auxiliary power circuit for compensating a transient power required by the load.

BACKGROUND OF THE INVENTION

To meet the increasing demand of large-scale data center and avoid possibility of data damage and loss in the large-scale data center, it is necessary to provide a power supply system for supplying stable and uninterruptible power to the loads in the large-scale data center.

The uninterruptible power supply system is different from an emergency power system and a backup power generator. Generally, the uninterruptible power supply system provides electric energy to the load by the power supply thereof when the input power is normal, and the uninterruptible power supply system provides transient protection by supplying electric energy stored in the energy storage device thereof when the input power source is interrupted. Namely, when an AC power source or a DC power is normal (e.g., a utility power source outputs electric energy stably), the power supply of the uninterruptible power supply system provides stable power to the loads (e.g., the data center). When the AC power source or the DC power source fails (e.g., the utility power source is interrupted), the energy storage device of the uninterruptible power supply system provides electric energy stored in the energy storage device to the loads. Consequently, the hardware in the large-scale data center for example computer, telecommunication equipment or other electrical equipment can be protected when an unexpected power interruption occurs.

The conventional uninterruptible power supply system includes a power supply and an energy backup device. However, the upper limit power outputted from the power supply and the energy backup device are limited. When a transient power consumption of the load provided by the power supply is greater than the normal power provided by the power supply, the power supply may shut down due to overload. Meanwhile, the energy backup device is enabled to provide overload current to the load, which may result in shortening the lifespan of a battery in the energy backup device. Moreover, the conventional uninterruptible power supply system has no power converter and current sharing circuit to cooperate with the energy backup device, so that the electric energy outputted from the energy backup device is unbalanced and the aging of the energy backup device is accelerated. In order to address the above-mentioned issues, more power supply devices and energy backup devices are needed to be employed in the uninterruptible power supply system so as to fix the issues of insufficient power, which may result in increasing the cost.

Therefore, there is a need of providing a power supply system so as to overcome the drawbacks encountered by the prior arts.

SUMMARY OF THE INVENTION

It is an object of the present disclosure to provide a power supply system. The power supply system includes at least one auxiliary power circuit for compensating a transient power required by the load, so that a power supply assembly is free of overloading and the lifespan of the batteries within the auxiliary power circuit are prolonged without increasing any cost.

In accordance with an aspect of the present disclosure, a power supply system is provided. The power supply system includes a power supply assembly, a first auxiliary power circuit and a control unit. The power supply assembly is electrically connected between an input power source and a load. When an input power outputted from the input power source is normal, the power supply assembly converts the input power into a first DC power. The first auxiliary power circuit is electrically connected between the power supply assembly and the load. The first auxiliary power circuit includes at least one first energy storage unit and at least one first power converter. The at least one first energy storage unit is configured to provide a second DC power. The at least one first power converter is electrically connected between the at least one first energy storage unit and the load. The at least one first power converter is configured to convert the second DC power to a first individual auxiliary power. The first auxiliary power circuit provides a first overall auxiliary power to the load according to the at least one first individual auxiliary power. The control unit is configured to drive the first auxiliary power circuit to output the first overall auxiliary power to the load when the input power is normal and a first transient power required by the load is greater than a first upper limit rated value of an output power outputted from the power supply assembly, so as to compensate a difference value between the first transient power and the first upper limit rated value.

In accordance with another aspect of the present disclosure, a power supply system is provided. The power supply system includes a power supply assembly, a first auxiliary power circuit, a second auxiliary power circuit and a control unit. The power supply assembly is electrically connected between an input power source and a load. When an input power outputted from the input power source is normal, the power supply assembly converts the input power into a first DC power. The first auxiliary power circuit is electrically connected between the power supply assembly and the load. The first auxiliary power circuit is configured to provide a first overall auxiliary power. The second auxiliary power circuit is electrically connected between the power supply assembly and the load. The second auxiliary power circuit is configured to provide a second overall auxiliary power. The control unit is configured to selectively drive at least one of the first auxiliary power circuit and the second auxiliary power circuit to output at least one of the first overall auxiliary power and the second overall auxiliary power to the load when the input power is normal and a first transient power required by the load is greater than a first upper limit rated value of an output power outputted from the power supply assembly, so as to compensate a difference value between the first transient power and the first upper limit rated value.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
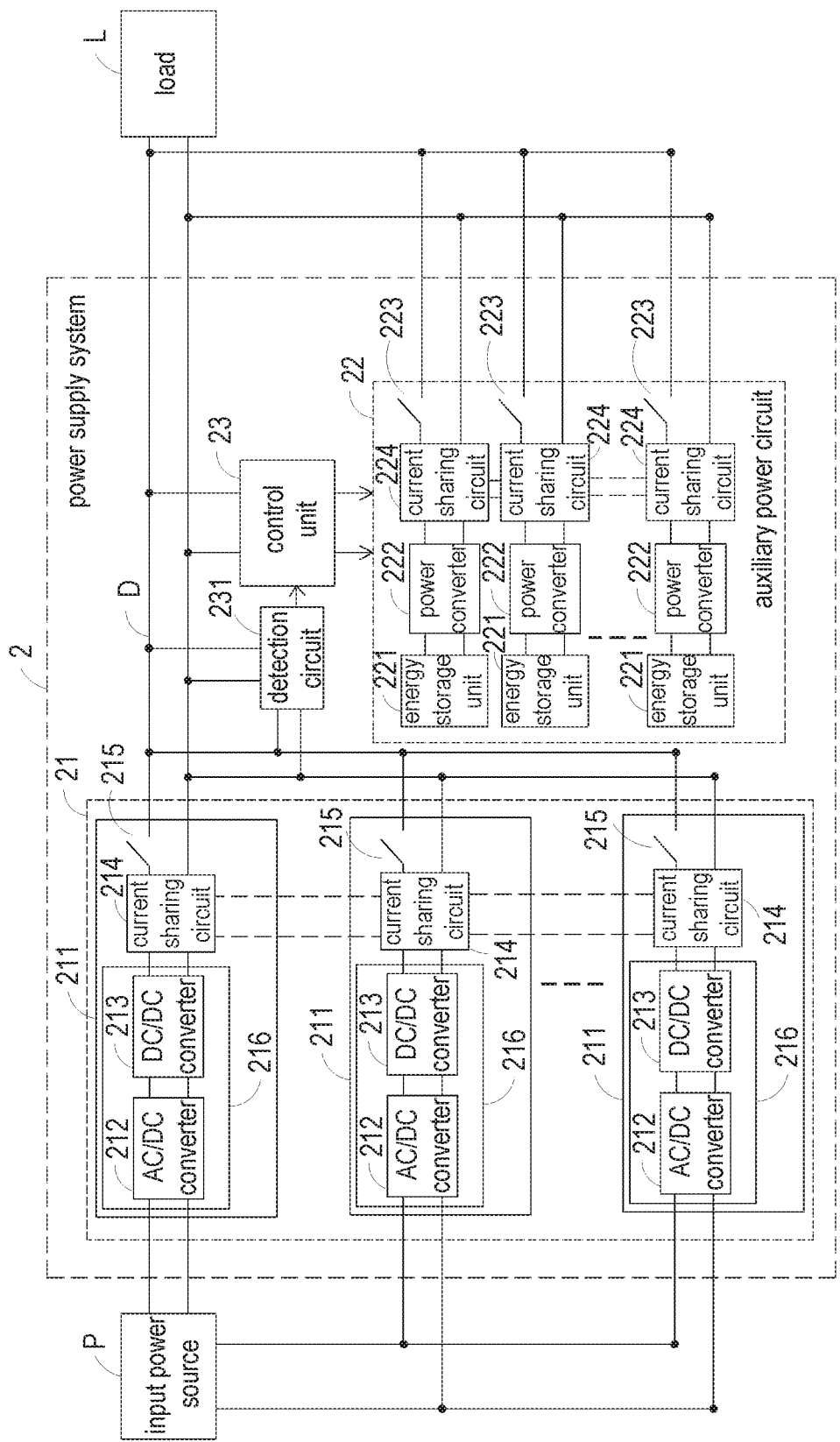
FIG. 1 is a schematic circuit diagram illustrating a power supply system according to a first embodiment of the present disclosure.

FIG. 1 is a schematic circuit diagram illustrating a power supply system according to a first embodiment of the present disclosure. As shown in FIG. 1, the power supply system 2 of the present disclosure is electrically connected between an input power source P and a load L. In this embodiment, the input power source P is a utility power source for providing AC power, but not limited thereto. In some embodiments, the input power source P is a DC power source, which is at least one selected from the group consisting of a solar panel, a fuel cell, a flywheel, a power generator, a renewable power generator and a combination thereof, for providing DC power. The power supply system 2 includes a power supply assembly 21, an auxiliary power circuit 22 and a control unit 23. The power supply assembly 21 is electrically connected with the input power source P. The power supply assembly 21 is electrically connected with the load L through a DC bus D. When an input power outputted from the input power source P is normal, the power supply assembly 21 receives the input power outputted from the input power source P, and the power supply assembly 21 converts the input power into a first DC power and provides the first DC power to the load L for driving the load L.

The auxiliary power circuit 22 is electrically connected with the power supply assembly 21 and the load L through the DC bus D. The auxiliary power circuit 22 provides an overall auxiliary power to the load L when the auxiliary power circuit 22 operates. The auxiliary power circuit 22 includes at least one energy storage unit 221 and at least one power converter 222. In this embodiment, the auxiliary power circuit 22 includes a plurality of energy storage units 221 and a plurality of power converters 222. Each energy storage unit 221 provides a second DC power. Each power converter 222 is electrically connected between the corresponding energy storage unit 221 and the load L. Each power converter 222 receives and converts the second DC power outputted from the corresponding energy storage unit 221 into an individual auxiliary power when the power converter 222 operates. Consequently, the auxiliary power circuit 22 provides the overall auxiliary power to the load L according to the plurality of individual auxiliary powers outputted from the energy storage units 221. In some embodiments, each energy storage unit 221 has a rated power. Preferably but not exclusively, the energy storage unit 221 is a secondary battery or a supercapacitor. In some embodiments, the plurality of energy storage units 221 are connected in series or in parallel to form a circuit structure. For example, the plurality of energy storage units 221 are connected with each other to form a matrix type circuit structure.

The control unit 23 is electrically connected with the power supply assembly 21 and the load L through the DC bus D, and is electrically connected with the auxiliary power circuit 22. In some embodiments, the auxiliary power circuit 22 includes a plurality of energy storage units 221 and a plurality of power converters 222. The control unit 23 drives the plurality of power converters 222 to operate so as to output the plurality of corresponding individual auxiliary powers to the load L when the input power outputted from the input power source P is interrupted or abnormal. Consequently, the auxiliary power circuit 22 provides the overall auxiliary power to the load L according to the plurality of corresponding individual auxiliary powers outputted from the plurality of power converters 222, so that the energy backup function is performed.

Moreover, the control unit 23 determines whether a transient power required by the load L is greater than a upper limit rated value of an output power outputted from the power supply assembly 21 when the power supply assembly 21 operates (i.e. the input power outputted from the input power source P is normal). Accordingly, the control unit 23 drives the auxiliary power circuit 22 to operate or not to operate according to a determination result. The control unit 23 drives the auxiliary power circuit 22 to operate when the transient power required by the load L is greater than the upper limit rated value of the output power outputted from the power supply assembly 21. Meanwhile, the control unit 23 determines the difference value between the transient power required by the load L and the upper limit rated value. The difference value can be compensated by the second DC power outputted from the energy storage unit 221. The control unit 23 calculates and obtains the requirement number of the energy storage unit 221 to be enabled for compensating the difference value. Accordingly, the control unit 23 drives the corresponding number of the power converters 222 to operate, so that the power converters 222 under operation receive and convert the second DC power outputted from the corresponding energy storage units 221 into the plurality of individual auxiliary powers. Therefore, the auxiliary power circuit 22 provides the overall auxiliary power to the load L according to the plurality of individual auxiliary powers outputted from the power converters 222 under operation. Consequently, the overall auxiliary power is provided to the load L to compensate the difference value between the transient power required by the load L and the upper limit rated value of the output power outputted from the power supply assembly 21.

In some embodiments, the power supply system 2 further includes a detection circuit 231. The detection circuit 231 detects the output power outputted from the power supply assembly 21 and one or more electrical parameter of the load L, for example but not limited to the voltage, the current or the power required by the load L, so as to obtain the transient power required by the load L. The detection circuit 231 transmits the detection information to the control unit 23 to be used as the basis of controlling or judging.

In this embodiment, when the input power outputted from the input power source P is normal (e.g., the utility power grid outputs electric energy stably), the power supply assembly 21 operates. The power supply assembly 21 outputs the first DC power to the load L. The control unit 23 drives the auxiliary power circuit 22 to provide the overall auxiliary power to the load L when the control unit 23 determines that the transient power required by the load L is greater than the upper limit rated value of the output power outputted from the power supply assembly 21 according to the detection result of the detection circuit 231. Consequently, the difference value between the transient power required by the load L and the upper limit rated value is compensated by the overall auxiliary power. In some embodiments, the control unit 23 drives the corresponding number of the power converters 222 to operate according to the difference value between the transient power required by the load L and the upper limit rated value. The individual auxiliary powers outputted by the corresponding number of the power converters 222 are served as the overall auxiliary power outputted from the auxiliary power circuit 22.

In this embodiment, when the input power outputted from the input power source P is normal and the power supply assembly 21 operates, and the power supply assembly 21 provides sufficient power to the load L when the control unit 23 determines that the transient power required by the load L is lower than or equal to the upper limit rated value of the output power outputted from the power supply assembly 21. Therefore, the control unit 23 needn't to drive the auxiliary power circuit 22 to provide the overall auxiliary power to the load L. Moreover, when the electrical energy stored in the energy storage unit 221 of the auxiliary power circuit 22 is not full, the control unit 23 controls the corresponding power converter 222 to convert the first DC power outputted from the power supply assembly 21 into the second DC power. The energy storage unit 221 is charged by the second DC power until the electrical energy stored in the energy storage unit 221 is full.

When the input power source P is abnormal (e.g., the utility power grid is interrupted or some conditions such as voltage drop, power surge, continuous undervoltage, continuous overvoltage and line noise occurance), the power supply assembly 21 is deactivated. Meanwhile, the control unit 23 drives the at least one power converter 222 to output the overall auxiliary power to the load L. Until the input power source P is normal, the power supply assembly 21 is activated. Meanwhile, the control unit 23 selectively drives the auxiliary power circuit 22 according to the requirement power of the load L.

As mentioned above, the power converter 222 of the auxiliary power circuit 22 of the power supply system 2 is driven when the transient power required by the load L is greater than the upper limit rated value of the output power outputted from the power supply assembly 21. Consequently, the overall auxiliary power outputted from the auxiliary power circuit 22 is provided to the load L to compensate the difference value between the transient power required by the load L and the upper limit rated value automatically. In such way, without increasing the output power outputted from the power supply assembly 21 or increasing the number of the energy storage units 221 of the auxiliary power circuit 22, the power supply assembly 21 is free of shutting down due to overload and the energy storage unit 221 of the auxiliary power circuit 22 is free of providing overloading power to the load L. Consequently, the lifespan of the energy storage unit 221 is prolonged, and the manufacturing cost of the power supply system 2 needn't be increased.

In some embodiments, the power converter 222 is a bidirectional power converter. In other words, the power converter 222 of the auxiliary power circuit 22 can convert the first DC power outputted from the power supply assembly 21 into the second DC power to charge the energy storage unit 221 and convert the second DC power outputted from the energy storage unit 221 into the individual auxiliary power to the load L.

In some embodiments, the power supply assembly 21 includes at least one power supply device 211. In this embodiment, the power supply assembly 21 includes a plurality of power supply devices 211. The plurality of power supply devices 211 are connected with each other in parallel. Each power supply device 211 includes a current sharing circuit 214, a switch 215 and a power converter 216. The power converter 216 converts the input power outputted from the input power source P into the first DC power. In this embodiment, the power converter 216 includes an AC/DC converter 212 and a DC/DC converter 213. The AC/DC converter 212 is electrically connected with the input power source P and receives and converts the AC power outputted from the input power source P into a DC transition power. The DC/DC converter 213 is electrically connected with the AC/DC converter 212 and receives and converts the DC transition power into the first DC power. In some embodiments, the DC/DC converter 213 of the power converter 216 is omitted. The AC/DC converter 212 of the power converter 216 directly converts the AC power into the first DC power. In some embodiments, in case that the input power source P provides the DC power, the AC/DC converter 212 of the power converter 216 is omitted. The DC/DC converter 213 of the power converter 216 directly converts the DC power into the first DC power.

The current sharing circuit 214 is electrically connected with the power converter 216 and configured to adjust the current outputted from the corresponding power converter 216, so that the current outputted from the power converter 216 is adjusted to be equal to the current outputted from the other power converter 216. Therefore, the plurality of power supply devices 211 share the current with each other by the plurality of current sharing circuits 214. Each switch 215 is electrically connected between the corresponding current sharing circuit 214 and the load L. The switch 215 is turned off when the power supply device 211 is deactivated, and the switch 215 is turned on when the power supply device 211 is activated. Therefore, the first DC power outputted from the power supply device 211 is transmitted to the load L through the corresponding switch 215 when the switch 215 is turned on.

Please refer to FIG. 1 again. In other embodiment, the auxiliary power circuit 22 includes at least one switch 223. Each switch 223 is electrically connected between the corresponding power converter 222 and the load L. The switch 223 is controlled by the control unit 23 to be turned on or turned off. When the power converter 222 is enabled to charge the energy storage unit 221 or the energy storage unit 221 outputs the individual auxiliary power, the control unit 23 controls the corresponding switch 223 to be turned on.

In some embodiments, the auxiliary power circuit 22 includes at least one current sharing circuit 224. Each current sharing circuit 224 is electrically connected between the corresponding power converter 222 and the corresponding switch 223 and configured to adjust the current of the individual auxiliary power outputted from the corresponding power converter 222 to be equal to the current of the individual auxiliary power outputted from the other power converter 222. Therefore, the current of the individual auxiliary power outputted from the power converter 222 under operation is equal to the current of the individual auxiliary power outputted from the other power converter 222 under operation. Consequently, current sharing function is achieved.

In some embodiments, when the load L needs relatively large transient power (i.e. the power supply assembly 21 fails to meet the requirement power of the load L), the output current from the current sharing circuits 214 and the output current from the current sharing circuits 224 are summed up to be sharing with each other. Hence, the output current from the current sharing circuit 214 is equal to the output current from the current sharing circuit 224. Consequently, the current sharing circuits 214 and the current sharing circuits 224 can share and balance the output current drawn by the load L. In some embodiments, the current sharing circuits 224 adjust the output current according to the output current drawn by the load L. Therefore, the output current from the current sharing circuits 214 may be different with the output current from the current sharing circuits 224.

Figure 2:
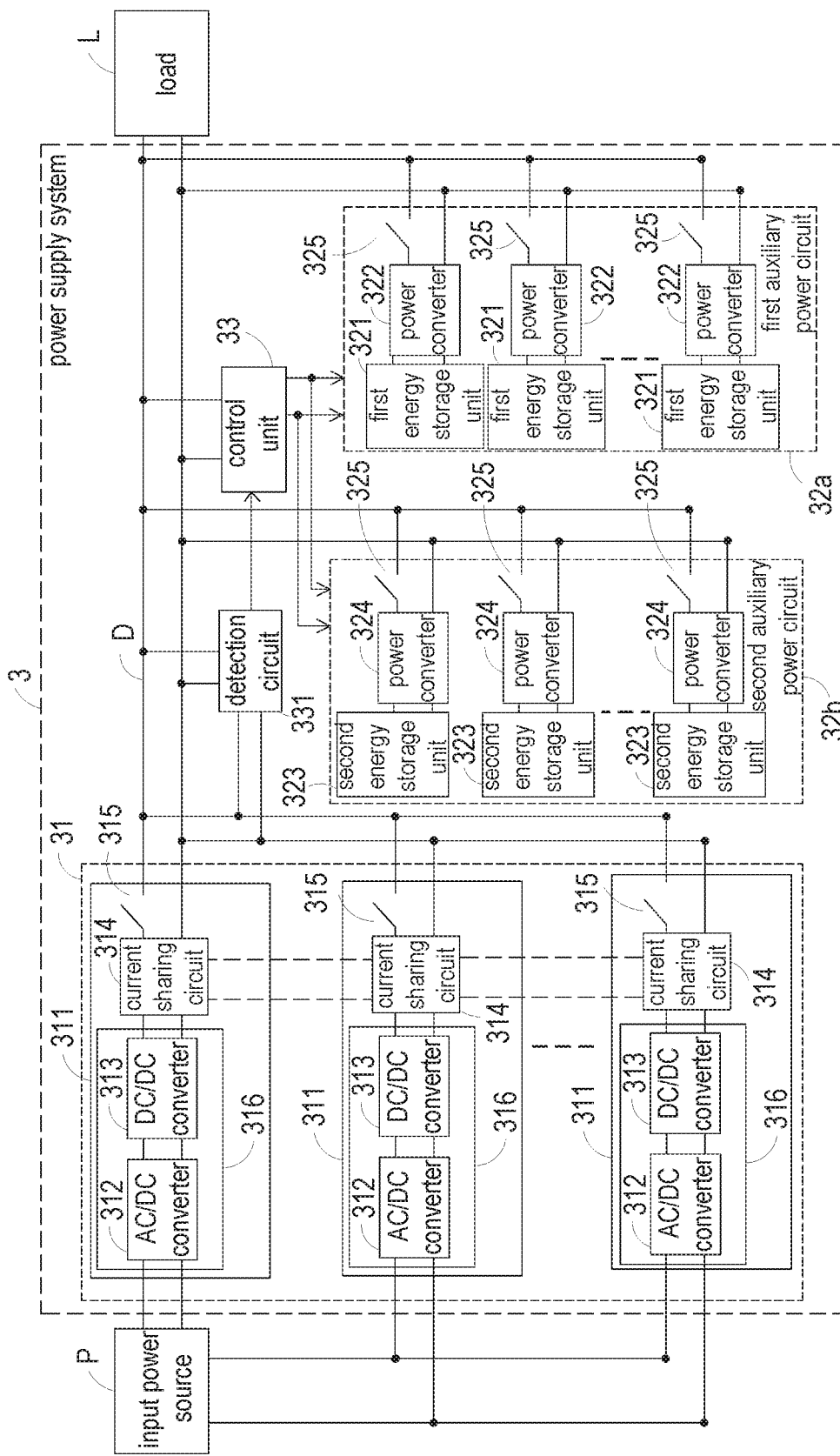
FIG. 2 is a schematic circuit diagram illustrating a power supply system according to a second embodiment of the present disclosure.

FIG. 2 is a schematic circuit diagram illustrating a power supply system according to a second embodiment of the present disclosure. The circuit topologies and functions of the power supply system 3 are similar to the circuit topologies and functions of the power supply system 2 of FIG. 1. Component parts and elements corresponding to those of the first embodiment are designated by identical numeral references, and detailed descriptions thereof are omitted. The power supply system 3 of this embodiment includes a first auxiliary power circuit 32a and a second auxiliary power circuit 32b. The first auxiliary power circuit 32a and the second auxiliary power circuit 32b are connected with the load L and the power supply assembly 31 through the DC bus D, respectively. The first auxiliary power circuit 32a includes at least one first energy storage unit 321 and at least one power converter 322 corresponding to the first energy storage unit 321. In this embodiment, the first auxiliary power circuit 32a includes a plurality of first energy storage units 321 and a plurality of power converters 322. Each first energy storage unit 321 provides a first individual auxiliary power through the corresponding power converter 322 to the load L. Therefore, the first auxiliary power circuit 32a provides a first overall auxiliary power to the load L according to the plurality of the first individual auxiliary powers outputted from the power converters 322. Similarly, the second auxiliary power circuit 32b includes at least one second energy storage unit 323 and at least one power converter 324 corresponding to the second energy storage unit 323. In this embodiment, the second auxiliary power circuit 32b includes a plurality of second energy storage units 323 and a plurality of power converters 324. Each second energy storage unit 323 provides a second individual auxiliary power through the corresponding power converter 324 to the load L. Therefore, the second auxiliary power circuit 32b provides a second overall auxiliary power to the load L according to the plurality of the second individual auxiliary powers outputted from the power converters 324.

In some embodiments, a power density of the first energy storage unit 321 is greater than a power density of the second energy storage unit 323. In some other embodiments, an energy density of the first energy storage unit 321 is lower than an energy density of the second energy storage unit 323. For example, the first energy storage unit 321 is a supercapacitor, and the second energy storage unit 323 is a secondary battery, but not limited thereto.

When the input power outputted from the input power source P is normal, the power supply assembly 31 operates and outputs the first DC power to the load L. The circuit topologies and the operations of the power supply assembly 31 of this embodiment are similar to the circuit topologies and the operations of the power supply assembly 21 of FIG. 1, and are not redundantly described herein. The control unit 33 preferentially drives the power converter 322 of the first auxiliary power circuit 32a to output the first overall auxiliary power to the load L when the control unit 33 determines that the transient power required by the load L is greater than the upper limit rated value of the output power outputted from the power supply assembly 31 (i.e. the control unit 33 determines it according to the detection result of the detection circuit 331), wherein the first energy storage unit 321 of the first auxiliary power circuit 32a has greater power density. Consequently, the first overall auxiliary power is provided to the load L to compensate the difference value between the transient power required by the load L and the upper limit rated value.

Moreover, after a period of time, if the power required by the load L is greater than the upper limit rated value outputted from the power supply assembly 31 continuously and the first overall auxiliary power outputted from the first auxiliary power circuit 32a is insufficient to compensate the difference value between the transient power required by the load L and the upper limit rated value, the power converters 324 of the second auxiliary power circuit 32b are driven that the second auxiliary power circuit 32b can provide the second overall auxiliary power to the load L for compensating the insufficient portion of the power required by the load L.

In an embodiment, when the input power outputted from the input power source P is abnormal, the power supply assembly 31 stops operating. Meanwhile, the control unit 33 preferentially drives the power converter 324 of the second auxiliary power circuit 32b, wherein the second energy storage unit 323 of the second auxiliary power circuit 32b has greater power density. Consequently, the second overall auxiliary power is provided to the load L to compensate the difference value between the transient power required by the load L and the upper limit rated value. Moreover, if the input power outputted from the input power source P is abnormal and the second overall auxiliary power outputted from the second auxiliary power circuit 32b and is insufficient to compensate the transient power required by the load L (i.e. the input power outputted from the input power source P is abnormal and the transient power required by the load L is greater than the upper limit rated value of the second overall auxiliary power outputted from the second auxiliary power circuit 32b), the control unit 33 drives the first auxiliary power circuit 32a simultaneously. Consequently, the first auxiliary power circuit 32a provides the first overall auxiliary power to the load L to compensate the additional portion of the power required by the load L.

Specifically, in case that the energy density (e.g., charge capacity) of the second energy storage unit 323 is greater than the energy density of the first energy storage unit 321. Consequently, when the input power outputted from the input power source P is abnormal and the backup circuit is needed to provide the power, the second auxiliary power circuit 32b is driven to operate preferentially so as to provide the power to the load L. Consequently, the power supply system 3 provides power to the load L sufficiently and continuously for a prolonged time period. Moreover, in case that the power density of the first energy storage unit 321 is greater than the power density of the second energy storage unit 323, the first auxiliary power circuit 32a can provide more power to the load L rapidly. Therefore, the first auxiliary power circuit 32a is driven preferentially so as to provide more power to the load L when the load L needs additional power.

In some embodiments, when the input power outputted from the input power source P is normal and the load L needs relatively large transient power, the second auxiliary power circuit 32b is driven to operate preferentially or the first auxiliary power circuit 32a and the second auxiliary power circuit 32b are driven to operate simultaneously so as to provide the power to the load L to compensate the additional portion of the power required by the load L. Similarly, when the input power outputted from the input power source P is abnormal, the first auxiliary power circuit 32a is driven to operate preferentially or the first auxiliary power circuit 32a and the second auxiliary power circuit 32b are driven to operate simultaneously so as to provide sufficient power to the Load L continuously.

In some embodiments, the first auxiliary power circuit 32a and/or the second auxiliary power circuit 32b include a current sharing circuit (not shown in FIG. 2) respectively. The operations and functions of the current sharing circuit of this embodiment are similar to the operations and functions of the current sharing circuit 224 of FIG. 2, and are not redundantly described herein. In some embodiments, the first auxiliary power circuit 32a and/or the second auxiliary power circuit 32b include at least one switch 325 respectively. The operations and functions of the switch 325 of this embodiment are similar to the operations and functions of the switch 215, 223 of FIG. 2, and are not redundantly described herein.

From the above descriptions, the present disclosure provides a power supply system. The power converter of the auxiliary power circuit of the power supply system is driven when the transient power required by the load L is greater than the upper limit rated value of the output power outputted from the power supply assembly. The overall auxiliary power outputted from the auxiliary power circuit compensates the difference value between the transient power required by the load L and the upper limit rated value. Therefore, the power supply assembly is free of shutting down due to overload and the energy storage unit of the auxiliary power circuit is free of providing overload power to the load L when the output power outputted from the power supply assembly is not increased or the number of the energy storage units of the auxiliary power circuit is not increased. The lifespan of the energy storage unit is prolonged. The manufacturing cost of the power supply system needn't be increased.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An uninterruptible power supply system, comprising:
  a power supply assembly electrically connected between an input power source and a load, wherein when an input power outputted from the input power source is normal, the power supply assembly converts the input power into a first DC power;
  a first auxiliary power circuit electrically connected between the power supply assembly and the load, and comprising:
    at least one first energy storage unit configured to provide a second DC power; and
    at least one first power converter electrically connected between the at least one first energy storage unit and the load and configured to convert the second DC power into a first individual auxiliary power, wherein the first auxiliary power circuit provides a first overall auxiliary power to the load according to the first individual auxiliary power;
  a second auxiliary power circuit electrically connected between the power supply assembly and the load and configured to provide a second overall auxiliary power to the load, wherein the second auxiliary power circuit comprises at least one second energy storage unit, wherein an energy density of the at least one second energy storage unit is greater than that of the at least one first energy storage unit, and a power density of the at least one first energy storage unit is greater than that of the at least one second energy storage unit; and
  a control unit configured to drive the first auxiliary power circuit to output the first overall auxiliary power to the load when the input power is normal and a first transient power required by the load is greater than a first upper limit rated value of an output power outputted from the power supply assembly, so as to compensate a difference value between the first transient power and the first upper limit rated value, wherein the first auxiliary power circuit is not driven when the first transient power required by the load is lower than or equal to the first upper limit rated value of the output power outputted from the power supply assembly, wherein when the input power is abnormal, the power supply assembly stops operating, and the control unit drives the second auxiliary power circuit to provide the second overall auxiliary power to the load.

2. The uninterruptible power supply system according to claim 1, further comprising a detection circuit configured to detect the output power outputted from the power supply assembly and at least one electrical parameter of the load, wherein the control unit determines whether the first transient power required by the load is greater than the first upper limit rated value according to a detection result of the detection circuit.

3. The uninterruptible power supply system according to claim 2, wherein the electrical parameter comprises the voltage, current or power required by the load.

4. The uninterruptible power supply system according to claim 1, wherein the at least one first energy storage unit comprises a plurality of first energy storage units and the at least one first power converter comprises a plurality of first power converters, wherein each of the first power converters is electrically connected between the corresponding first energy storage unit and the load, wherein the control unit drives the corresponding number of the first power converters according to the difference value between the first transient power required by the load and the first upper limit rated value.

5. The uninterruptible power supply system according to claim 4, wherein the first auxiliary power circuit comprises a plurality of first current sharing circuits, and each of the first current sharing circuits is electrically connected with the corresponding first power converter and configured to adjust current outputted from the corresponding first power converter to be equal to the current outputted from the other power converter.

6. The uninterruptible power supply system according to claim 1, wherein the power supply assembly comprises a plurality of power supply devices, the plurality of power supply devices are connected with each other in parallel, and each of the power supply devices comprises:
  a second power converter configured to convert the input power into the first DC power; and
  a second current sharing circuit electrically connected with the second power converter and configured to adjust current outputted from the second power converter to be equal to the current outputted from the other second power converter.

7. The uninterruptible power supply system according to claim 1, wherein when the input power is abnormal, the power supply assembly stops operating, and the control unit drives the first auxiliary power circuit to provide the first overall auxiliary power to the load.

8. The uninterruptible power supply system according to claim 1, wherein the first power converter is a bidirectional power converter.

9. The uninterruptible power supply system according to claim 1, wherein wherein when a second transient power required by the load is greater than a second upper limit rated value of the second overall auxiliary power outputted from the second auxiliary power circuit, the control unit drives the first auxiliary power circuit to provide the first overall auxiliary power to the load for compensating a difference value between the second transient power and the second upper limit rated value.

10. An uninterruptible power supply system, comprising:
a power supply assembly electrically connected between an input power source and a load, wherein when an input power outputted from the input power source is normal, the power supply assembly converts the input power into a first DC power;
a first auxiliary power circuit electrically connected between the power supply assembly and the load and configured to provide a first overall auxiliary power to the load, wherein the first auxiliary power circuit comprises at least one first energy storage unit;
a second auxiliary power circuit electrically connected between the power supply assembly and the load and configured to provide a second overall auxiliary power to the load, wherein the second auxiliary power circuit comprises at least one second energy storage unit, wherein an energy density of the at least one second energy storage unit is greater than that of the at least one first energy storage unit, and a power density of the at least one first energy storage unit is greater than that of the at least one second energy storage unit; and
a control unit configured to drive the first auxiliary power circuit to output the first overall auxiliary power to the load when the input power is normal and a first transient power required by the load is greater than a first upper limit rated value of an output power outputted from the power supply assembly, so as to compensate a difference value between the first transient power and the first upper limit rated value, wherein when the input power is abnormal, the power supply assembly stops operating, and the control unit drives the second auxiliary power circuit to provide the second overall auxiliary power to the load for maintaining the power required by the load, when the input power is abnormal and a second transient power required by the load is greater than a second upper limit rated value of the second overall auxiliary power outputted from the second auxiliary power circuit, the control unit further drives the first auxiliary power circuit to provide the first overall auxiliary power to the load for compensating a difference value between the second transient power and the second upper limit rated value.

11. The uninterruptible power supply system according to claim 10, wherein the control unit drives the first auxiliary power circuit to provide the first overall auxiliary power to the load according to the difference value between the first transient power required by the load and the first upper limit rated value, so as to compensate the difference value between the first transient power and the first upper limit rated value.

12. The uninterruptible power supply system according to claim 11, wherein when the first overall auxiliary power is insufficient to compensate the difference value between the first transient power and the first upper limit rated value, the second auxiliary power circuit is driven to provide the second overall auxiliary power to the load for compensating an insufficient portion of the power required by the load.

* * * * *